United States Patent [19] [11] 3,998,618
Kreick et al. [45] Dec. 21, 1976

[54] METHOD FOR MAKING SMALL GAS-FILLED BEADS

[75] Inventors: John R. Kreick; Glenn A. Anderson, both of Nashua, N.H.

[73] Assignee: Sanders Associates, Inc., Nashua, N.H.

[22] Filed: Nov. 17, 1975

[21] Appl. No.: 632,419

[52] U.S. Cl. .................................. 65/105; 65/110
[51] Int. Cl.$^2$ ........................................ C03B 23/10
[58] Field of Search .................... 65/105, 108, 110

[56] References Cited
UNITED STATES PATENTS

| | | | |
|---|---|---|---|
| 2,187,432 | 1/1940 | Powers | 65/105 X |
| 3,186,812 | 6/1965 | Pfaender | 65/110 X |

Primary Examiner—Arthur D. Kellogg
Attorney, Agent, or Firm—Louis Etlinger; Robert K. Tendler

[57] ABSTRACT

A method and apparatus are disclosed for making small gas-filled beads by locating a heat deformable tube on top of a heated platen in a controlled atmosphere chamber, with a multiple, spaced knife-edge structure located on top of the tube. When the temperature of a tube is raised to its softening temperature, gravity forces the knife edges through the tube, sealing the tube into separated compartments or ampuls with gas in the interior of each compartment. The articles are cooled below the softening temperature of the tube, are separated into ampuls and then the ampuls are reheated above the softening temperature to the working temperature of the tube in a sphere forming cycle under conditions of carefully maintained temperature and pressure such that the surface tension of the glass coupled with the gas within the ampul causes the ampul to take on the shape of a sphere with uniformly thick walls and size, dependent on the temperature and pressure conditions during the reheating cycle.

11 Claims, 3 Drawing Figures

METHOD FOR MAKING SMALL GAS-FILLED BEADS

FIELD OF THE INVENTION

This invention relates to the manufacture of small gas-filled beads and more particularly to a method involving the formation of a gas-filled ampul of any configuration followed by the reheating of the gas filled ampul above the plastic temperature of its walls under controlled temperature and pressure conditions such that a sphere is formed due to the surface tension associated with the walls of the ampul.

It has long been known that ampuls can be made by pinching off tubes, either filled or not, in a continuous process either by a two sided pinching operation or by the placing of a tube on a platen and by coming down on the other side of the tube with a deforming and/or sealing member. These ampuls generally take on the configuration of the pinching apparatus and thus the pinching apparatus acts in the manner of a mold with respect to the formation of the final article. In other methods the tube maintains its generally cylindrical shape and is merely sealed at the ends by the deforming/sealing member. While it is possible to make spherical sealed cavities with the above mentioned apparatus it is only with extreme difficulty, if at all, that spheres as small as 20 mils O.D. can be manufactured with uniform wall thickness, size or in the case of gas filled chambers, with a uniform gas pressure. The ability to fabricate such spheres is of prime importance in the fabrication of a gas discharge display such as that described in U.S. Pat. No. 3,848,248 issued to A. J. MacIntyre Jr. on Nov. 12, 1974 in which individual very small glass beads are placed between the electrodes of a so called "crosspoint" matrix. In a crosspoint matrix each of the glass beads is placed between electrodes at a crosspoint or point of electrode overlap of the matrix and each of the beads is filled with an ionizable gas. The matrix is driven such that for the excitation of a desired bead, the electrodes immediately above and below the bead at a given crosspoint are provided with an electric voltage differential sufficient to cause ionization of the gas in the bead therebetween. The ionization potential is critical to the initiation of ionization in the glass bead and it is important therefore that this ionization potential be known and be equal for all of the beads in the display. It will be appreciated that it would be difficult to design a driving system for the matrix, if the beads were to have different firing threshold voltages. The firing threshold of a gas filled bead is determined by the particular gas contained in the bead, the pressure of this gas, the size of the bead, and the wall thickness of the bead. All of these parameters must be carefully controlled in order for the gas discharge panel to operate properly.

Prior art methods of manufacturing beads do not yield beads of sufficiently controlled size, wall thickness or gas pressure and thus are unacceptable in the making of beads for this application.

In the subject system, the problem of manufacturing beads with close tolerances is solved in one embodiment by the filling of glass tubes with ionizable gas at a predetermined pressure and sealing the tubes. These tubes are placed on a flat platen which is heated and the platen is placed in a controlled environment chamber with the heat applied being readily controllable and the atmosphere in the chamber also being readily controllable both as to temperature and pressure. On top of one or more of these gas filled tubes is placed a structure involving a series of vertically oriented spaced knife edges. In one embodiment these knife edges are razor blades which are spaced with heavy material and the structure is clamped together. This structure is then placed on top of the tube or tubes and the platen is heated until the tube reaches its softening temperature. At this time the razor blades, due to the force of gravity, pinch the tube against the platen and form the tube into individual compartments. In one embodiment the chamber pressure is maintained slightly below the existing in the tubes such that the tube does not collapse on itself when raised to its softening temperature. Alternatively, the tube need not be prefilled but rather filled by the gas in the chamber. In this case, the temperature of the platen is maintained at the low end of the plastic region for the tube such that the tube will not collapse on itself by its own weight. After the ampuls have been formed by virtue of the cutting action and sealing action of the weighted razor blades, the temperature of the platen is brought below the softening temperature of the tubing. At this point the individual ampuls may be taken out of the chamber and cleaned to remove any contaminant which would result in the formation of a non-spherical structure. If platinum blades and platens are utilized, contamination may be kept at a minimum thereby obviating the need for the cleaning process.

After the formation of the individual sealed ampuls and/or the cleaning thereof the ampuls are again heated, this time to the working temperature of the tubing, which is in excess of the softening temperature of the tubing. Both the softening and working temperatures are within the temperature range at which the tubing walls are plastic. At the same time a predetermined pressure differential is maintained. With the rise in temperature, the surface tension of the glass causes the ampul to form a perfect sphere. While this sphere formation would occur with certain solid heat deformable bodies due to surface tension, the weight of most solid structures would prevent sphere formation. The reason is that effect of the surface tension is in general less than that of gravitational force (which is proportional to the weight or mass of the object). Surface tension if acting alone produces spheres because it forces the fluid material to occupy the least possible volume (e.g. a sphere). With solid bodies, gravity acting on a solid body supported on a platform tends to overcome this sphere forming force and the result is a structure occupying more volume than a sphere, e.g. a flattened structure.

However, when a hollow body filled with gas is used, the weight of the body is reduced and gravity has less of an effect. Thus surface tension is the predominant forming agent and substantially perfect spheres are formed.

It will be appreciated that the gas pressure inside the ampul and the ambient gas pressure outside the ampul affects the final size and wall thickness of the sphere. By careful regulation of the pressure outside the ampul during the period when the ampul walls are soft, spheres of predetermined size and wall thickness may be formed. If the ambient pressure outside the ampuls is initially made greater than the internal ampul pressure the sphere will shrink from this predetermined size and smaller thick-walled spheres are formed. Conversely, when the ambient pressure outside the ampul is less than the internal gas pressure by more than that used to form the predetermined size spheres, then the result is that the spheres balloon out and larger thinner walled spheres are formed. For larger thin walled spheres, during the time the softening temperature of the tube material is exceeded the pressure of the chamber is kept below the internal pressure in the ampul. For smaller thick-walled beads the chamber pressure is initially greater than the internal gas pressure. In either case, for more precise size control, after the bead has reached the desired size and wall thickness the ambient pressure in a preferred embodiment is kept below the internal gas pressure to the extent that the surface tension of the softened walls when added to the chamber pressure is equal the internal gas pressure in the bead after the sphere has reached its correct diameter. The bead is then cooled down and removed.

What has been provided is a method of making extremely small, extremely uniform beads by virtue of forming a sphere through the effect of surface tension on a hollow gas filled body and by maintaining a predetermined pressure differential as the ampul is raised above its softening temperature. While the subject method and apparatus has particular application to the manufacturing of beads with ionizable gas therein, it will be appreciated that the subject process may be utilized in the formation of hollow beads for any use whatsoever including, for instance, the manufacturing of these beads as filler material for plastics or as light reflecting material for use in paints for illuminated signs, etc. where bead tolerances are not critical.

It is therefore an object of this invention to provide an improved method and apparatus for making small beads.

It is another object of this invention to provide an improved method and apparatus for the manufacturing of beads with uniform size and wall thickness.

It is a further object of this invention to provide small beads with ionizable gas therein with uniformity of gas pressure, wall thickness and size such that these beads may be utilized in gas discharge panel displays.

It is a still further object of this invention to provide a gravity actuated method and apparatus for forming small ampuls.

It is a still further object of this invention to provide a method and apparatus for the formation of spherical structures from irregularly shaped gas filled containers in which the gas filled container is subjected to heat sufficient to plasticize the walls thereof and pressure and temperature conditions sufficient to reform the container into a sphere by virtue of the surface tension of the container wall material and the internal gas pressure associated with the gas in the container.

These and other objects will be better understood in connection with the following description in view of the appended drawings in which:

DETAILED DESCRIPTION

Figure 1:
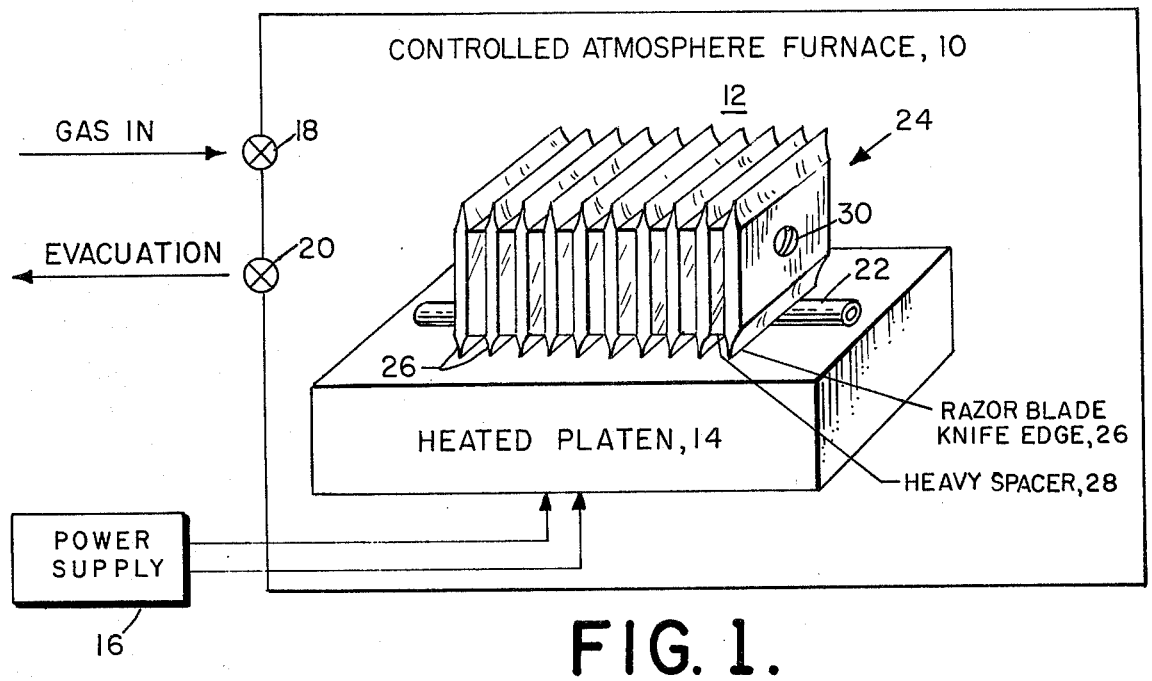
FIG. 1 is a diagrammatic representation of the vertically oriented spaced knife blade unit atop a tube resting on a heated platen for practicing of the subject invention.

Referring to FIG. 1 a controlled atmosphere furnace 10 is illustrated as having a chamber 12 in which is located a heated platen 14 controlled by a power supply 16. Gas is introduced into chamber 12 by a valving system generally indicated by the reference character 18 and may be evacuated via apparatus (not shown) through a valving system generally indicated by reference character 20. The valving systems are under the control of a system for adjusting gas pressure (not shown) in accordance with criteria to be described. Since pressure regulation apparatus for vacuum furnaces is conventional, the apparatus is not described. In one embodiment the chamber is evacuated down to $10^{-7}$ torr by conventional evacuation apparatus which may or may not include a gettering system.

In one embodiment a sealed gas-filled tube 22 is placed on heated platen 14 and a multiple, spaced knife-blade structure generally indicated by reference character 24 is placed cross-wise on top of the tube. This structure generally includes vertically oriented knife blades 26 which may conveniently be stainless steel razor blades. Sandwiched inbetween the razor blades are heavy spacing blocks 28. When the blocks and blades are clamped together via a bolt 30 a rigid sandwich structure is formed.

As will be described hereinafter, it is important during the process of forming the ampuls that the tube not be stained or contaminated by the metal of the knife blades or the platen. While stainless steel results in minimal staining from the blades and platen, blades and a platen of platinum may be preferable.

As to the composition of the glass tube, in one embodiment the tube is made of Corning Glass Model No. 8161. The tube is backfilled in this embodiment with 95% neon and 5% argon by weight to a pressure of 300 torr. In the embodiment discussed, the final diameter of the sphere formed is 20 mils (0.020 inches) with a wall thickness of 0.001 – 0.002 inches. While a specific example will be described, it will be appreciated that any heat-deformable tube may be utilized and may be back filled with any gas which does not significantly react with the tube. The only qualification for the tube is that it have a plastic region which at the lower end includes a softening point at which tube walls maintain some rigidity and a working temperature which is that temperature at which surface tension is effective in changing the shape of an ampul made from this tubing. The surface tension of the tubing at the working temperature is to be such that the gas will not escape. As such the working temperature is obviously below the vaporization temperature of the tubing material.

Figure 2:
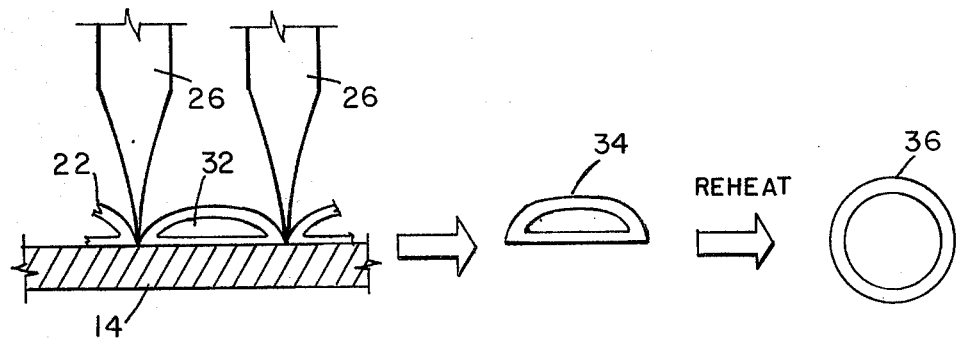
FIG. 2 is a diagrammatic illustration of the series of steps in the formation of a gas filled sphere including the formation of ampuls via the knife blade structure of FIG. 1 and the formation of spheres by reheating the ampuls under controlled conditions of temperature and pressure.

Referring now to FIG. 2, in operation, tube 22 is filled with gas and sealed. The tube is then heated to its softening temperature at which time knife blades 26 seal the tube into a number of compartments 32 by virtue of the gravitational force on the knife edge unit. After the softening temperature has been maintained for a predetermined period of time, typically 30 seconds in one embodiment, knife blades 26 pierce through the tubing and come to rest on platen 14. This produces individual hollow gas-filled structures or ampuls 34 which are self supporting when the temperature is reduced below the softening temperature of the tubing.

Thereafter the ampuls are heated in a controlled atmosphere such that walls of the ampul are raised above the softening temperature to the aforementioned working temperature. With carefully controlled temperature and pressure the surface tension of the glass and the gas within the ampul reshapes the ampul to form a perfect sphere 36. It will be appreciated that during the sphere forming cycle the pressure within the furnace may be maintained slightly below that of the gas within the ampul to permit sphere formation without enlargement or shrinking.

The following equations permit the determination of the initial parameters for the process in terms of the desired outside diameters $D_1$ and inside diameter $D_2$ of the final sphere. In the following formulas the outside diameter of the initial tube is $D_3$ and the inside diameter of this tube is $D_4$. The distance between adjacent knife blades is given by L.

The following equation relates the mass in the glass tube vs. the mass of the resultant sphere:

$$\frac{\pi}{4}(D_3^2 - D_4^2) L = \frac{4}{3}\pi \left[\left(\frac{D_1}{2}\right)^3 - \left(\frac{D_2}{2}\right)^3\right] \quad (1)$$

To obtain a pressure $P_1$ in a sphere of diameter $D_2$:

$$P_1 \frac{4\pi}{3}\left(\frac{D_2}{3}\right)^3 = nRT \quad (2)$$

$$n = \frac{P_1 \frac{4\pi}{3}\left(\frac{D_2}{2}\right)^3}{RT} \quad (3)$$

where $n$ is the number of moles of gas, $T$ is temperature and $R$ is a constant.

Assuming that a tube initially has an inside diameter of $D_4$, the pressure to which this tube should be filled, $P_2$, to produce a sphere having an inside diameter $D_2$ and pressure $P_1$ is derived as follows:

$$P_2 \pi \left(\frac{D_4}{2}\right)^2 L = nRT \quad (4)$$

$$P_2 \pi \left(\frac{D_4}{2}\right)^2 L = P_1 \frac{4\pi}{3}\left(\frac{D_2}{2}\right)^3 \quad (5)$$

Therefore $$P_2 = \frac{P_1 \frac{4\pi}{3}\left(\frac{D_2}{2}\right)^3}{\pi \left(\frac{D_4}{2}\right)^2 L} \quad (6)$$

Since $P_1$, the desired pressure in the sphere is known and since the inside diameter of the sphere, $D_2$, and the inside diameter of the tube, $D_4$, are known, and since L is specified, then the pressure in the tube, $P_2$, is uniquely specified.

Figure 3:
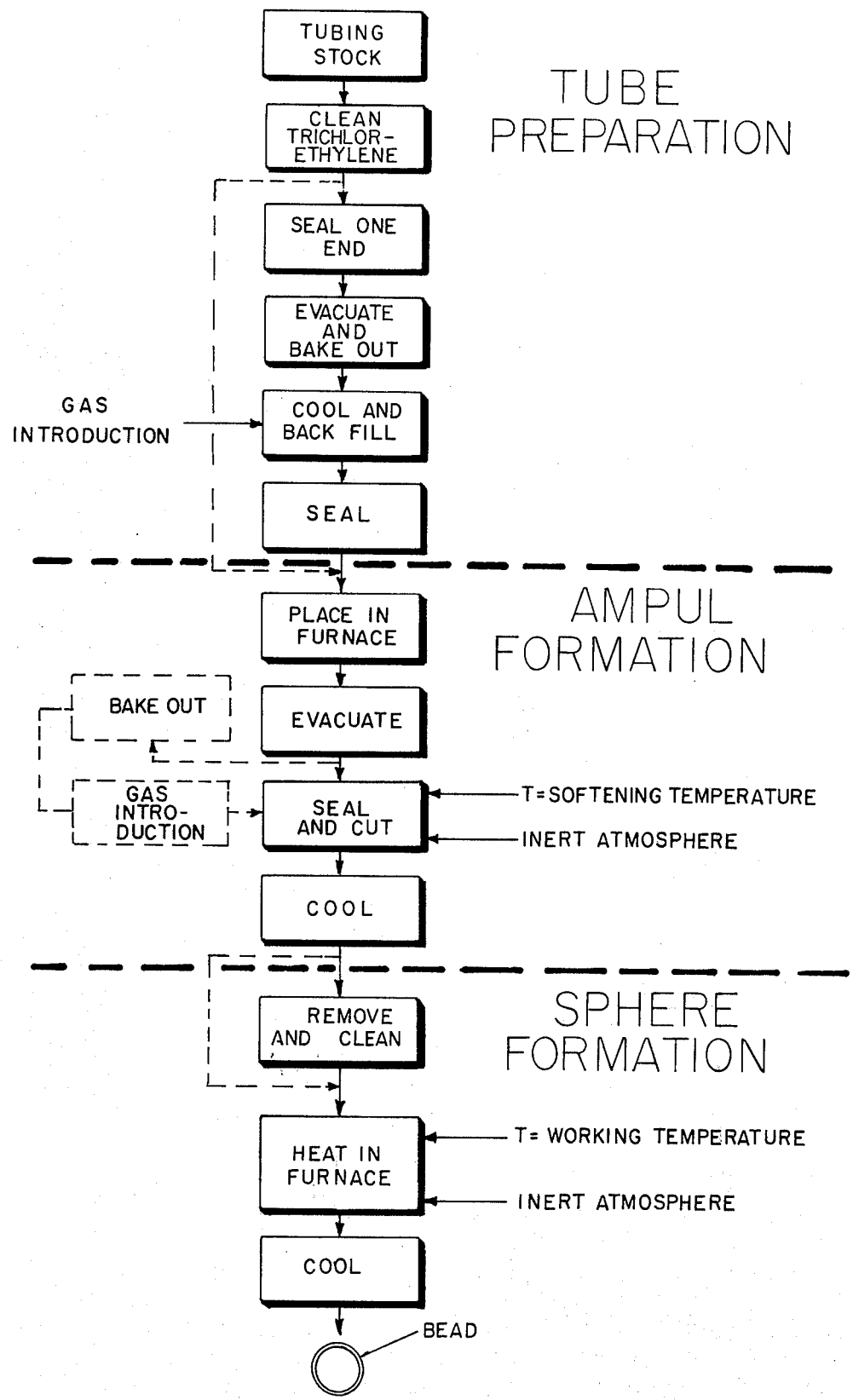
FIG. 3 is a block diagram illustrating two methods for fabricating spherical gas filled beads.

As described hereinbefore, the method of manufacturing these small gas-filled beads may be accomplished either by initially backfilling and sealing the tube or by placing the tube in the controlled atmosphere furnace and by filling the tube with gas from the furnace. Referring to FIG. 3 the backfilling method will be described first followed by a description of the in-the-furnace filling process.

In the illustrative examples that follow several severe contrants are placed on the gas-filled bead formation when these beads are to be utilized in a gas discharge display panel. While in other applications it may not be necessary to clean the tubing prior to the bead formation, in order to achieve uniform firing characteristics for the beads in the plasma display panel, it is necessary that the ionizable gas be kept as pure as possible with as few contaminants as possible. Contaminants of a gaseous nature in general affect not only the internal gas pressure but also the ionization characteristics of the gas within the finally formed beads. Contaminants such as water vapor, oxygen, nitrogen, and carbon dioxide not only affect the internal gas composition but also, when the tubing is heated to its plastic temperatures, the contaminants may react with the tubing material to change the dielectric constant of this material which, in turn, affects the firing potential for the beads. When, however, the beads are to be used as filler material for plastics or used in various types of paints for increasing the reflectivity of a paint it will be appreciated that the size of the spheres is not critical and the internal gas composition is likewise not particularly critical. It will therefore be appreciated that the cleaning steps described hereinafter may be omitted for applications where sphere parameters are not critical.

Assuming, for the present example, that the spheres are to contain ionizable gas, one method of manufacturing such beads is divided into three operations, namely: tube preparation; ampul formation; and sphere formation.

Referring now to FIG. 3, tubing stock is selected both for its dielectric properties and for properties determined by the aforementioned formuli. In the formation of 20 mil spheres filled with 95% neon and 5% argon by weight at 300 torr with a 2 mil wall thickness, Corning Glass No. 8161 is selected. The tubing is first cleaned in a trichloroethylene solution and sealed at one end. The tube is then attached to a vacuum/backfill manifold which is evacuated to $10^{-7}$ torr and maintained at a temperature of 200° C for a period of five hours. This drives off the water vapor from the tubing as well as the nitrogen, oxygen and carbon dioxide which may be present. The tubing is then backfilled with the particular ionizable gas selected to a pressure $P_2$. In one embodiment the internal gas pressure of the tube is maintained at 257 torr at ambient temperature. Thereafter the tube is sealed at the other end which completes the tube preparation.

The tubes are now placed into the controlled atmosphere furnace on top of the heated platen described hereinbefore in advance of ampul formation. On top of the tube is placed the aforementioned knife blade unit. The controlled atmosphere chamber is evacuated and filled with an inert atmosphere, typically argon. In the preferred embodiment the pressure within the furnace is maintained slightly below that of the internal pressure of the sealed tube so that when the tube is raised to its softening point the tube will not collapse on itself. The tube is then raised to its softening temperature for a limited period of time typically between 580° C and 630° C, and is maintained at this softening temperature for approximately 30 seconds. At this time the sealed compartments are formed followed by the formation of the ampuls due to the separation of the compartments as the knife blades cut completely through the tubing. Thereafter the ampuls are cooled to ambient temperature and are removed from the furnace for cleaning. It will be appreciated that if the knife blades do not cut completely through the structure the compartments may be broken apart to form the ampuls during cleaning.

The cleaning step may be necessary when stainless steel platens and blades are utilized should the ampul walls show staining. Staining refers to contamination of the walls via metal from either the platen or the knife blades. This contamination will be external to the ampul and may be removed by a chemical etching process via the use of HF acid. Cleaning can further be enhanced by ultrasonic cleaning in water and then acetone. After cleaning, which also removes any grease or oils involved in the removal stage, the ampuls are replaced in the furnace and are placed on a non-sticking graphite boat or platform. The furnace is first evacuated and then filled with an inert atmosphere such as argon whereupon the furnace temperature is raised to the working temperature of the glass, in this case between 650° C and 750° C.

In one embodiment involving the larger thin walled spheres, during the time that the softening temperature of the glass is exceeded it is important that the furnace pressure be maintained less than the internal gas pressure in the ampul. As the temperature goes from the softening temperature to the working temperature it is desireable that pressure differential between the internal ampul pressure and the furnace pressure be kept constant, although this is not a necessity. Once the bead has reached its desired diameter and therefore its desired wall thickness, the furnace pressure is increased to the point at which the sphere is no longer enlarging. This pressure will be the internal gas pressure in the sphere minus the pressure exerted by the surface tension of the glass. It is important to maintain this relationship to assure uniform size spheres as the furnace temperature is reduced in the cooling step. This is maintained until such time as the furnace temperature drops below the softening temperature of the glass. Thereafter the furnace pressure may be dropped quite rapidly. After the spheres have been cooled to ambient they may be removed from the furnace as the finished product. For smaller thick walled spheres the furnace pressure is maintained greater than the internal gas pressing until the desired sphere size is attained. Thereafter the furnace pressure is reduced to slightly below the internal pressure as indicated above to pressure sphere size.

As mentioned hereinbefore, it is possible to fill the tube while the tubes are in the furnace during ampul formation. The tubing in this case is cleaned as mentioned hereinbefore and is placed in open-ended form in the furnace with the knife blade unit on top of the tubing and the tubing resting on the heated platen. In this embodiment the furnace is evacuated and a bakeout cycle is commenced with the tubes heated at 200° C and the vacuum at $10^{-7}$ torr. Thereafter the ionizable gas is introduced into the furnace from which location it fills the open-ended tube. The furnace is then brought to the softening temperature of the glass and, due to the pressure exerted by the blades in the knife blade unit sealing occurs without internal collapse of the tube. It will be appreciated that care must be taken to avoid raising the furnace temperature above that at which the tubes just begin to soften in order to avoid internal collapse of the tubes. Because additional pressure is being placed on the tubes by the knife blades the tubes will collapse under the pressure of the knife blades only at the points of contact, leaving the remainder of the tube intact.

An additional example of the first mentioned process is given as follows:

EXAMPLE

Manifold quantity of glass tubing 0.0075 inch I.D. × 0.010 inch O.D. × 30 inches (Corning 8161).
Bakeout 100° C – 200° C, 5 hours at $5 \times 10^{-5}$ torr.
Backfill with 422 torr, 97% neon, 3% argon.
Separate from manifold by oxy-propane torch.
Cut 30 inch tube into 1 inch lengths with oxy-propane torch by progressively halving each section.
Place 1 inch tubes side by side on ground flat steel plate.
Place knife blade unit crosswise on top of tubes: interblade spacing L = 0.055 inch.
Bakeout 300° C, $5 \times 10^{-5}$ torr, 4 minutes.
Introduce argon, 1188 torr and maintain constant pressure.
Raise temperature to 600° C.
Maintain 600° C temperature for 30 seconds.
Allow furnace to cool naturally.
Remove and clean ampuls, 50% concentrated HF acid.
Ultrasonic rinse in water and then acetone.
Place on graphite boat in furnace.
Evacuate furnace to $5 \times 10^{-5}$ torr.
Introduce argon at 1160 torr constant pressure.
Increase furnace temperature to 710° C.
Hold 710° C for 30 seconds.
Allow furnace to cool naturally.
Sphere: 0.019 inch O.D. × 0.017 inch I.D., 492 torr gas pressure.

What has therefore been provided is a method and apparatus for use in the manufacture of uniform spheres which are gas filled. The process involves the use of gravity-actuated cutting blades and a sphere forming step in which ampuls of any configuration are given a spherical configuration by virtue of heating the walls of the ampuls, surface tension, and the gas inside. Not only does this sphere formation result in such uniformity as to make gas discharge displays utilizing gas filled beads practical, it also provides an efficient method and apparatus for the formation of very small hollow beads for use as filler material or as light reflecting material. As filler material it will be appreciated that the subject beads have an advantage over solid beads in that the gas filled structure provides reduced thermotransfer. This results in a material with improved thermal insulation characteristics. In general what has been provided is a method of forming gas-filled enclosures comprising the steps of providing a sealed hollow structure containing a gas and having heat deformable walls which are deformable above a predetermined softening temperature, with the structure being maintained at a temperature below the softening temperature of the walls, whereby the structure is substantially rigid; heating the hollow structure provided in a sealed furnace in an unrestrained substantially free condition above the softening temperature of the walls to a range at which the walls become stretchable while still maintaining the original integrity of the hollow structure; initially controlling the pressure of the gas within the sealed furnace such that the hollow structure is permitted to expand; increasing the pressure of the gas surrounding the hollow structure when a desired size is obtained to a pressure which balances the forces of expansion; and cooling the hollow structure in the sealed pressurized furnace below the softening temperature to form a substantially rigid hollow structure of a predetermined size.

Although a specific embodiment to the invention has been described in considerable detail for illustrative purposes, many modifications will occur to those skilled in the art. It is therefore desired that the protection afforded by Letters Patent be limited only by the true scope of the appended claims.

We claim:

1. A method of forming gas-filled enclosures comprising the steps of
   providing a sealed hollow structure containing a gas and having heat deformable walls which are deformable above a predetermined softening temperature, said structure being maintained at a temperature below the softening temperature of said walls, whereby said structure is substantially rigid;
   heating the hollow structure provided in a sealed furnace in an unrestrained substantially free condition above the softening temperature of said walls to a range at which said walls become stretchable while still maintaining the original integrity of the hollow structure;
   initially controlling the pressure of the gas within said sealed furnace such that said hollow structure is permitted to expand;
   increasing the pressure of the gas surrounding said hollow structure when a desired size is obtained to a pressure which balances the forces of expansion; and
   cooling the hollow structure in the sealed pressurized furnace below said softening temperature to form a substantially rigid hollow structure of a predetermined size.

2. The method of claim 1
   wherein the step of providing a sealed hollow structure includes the steps of
   placing a heat deformable tube on a heatable platen in a controlled atmosphere furnace; and
   filling, severing and sealing said tube by placing a multiple, spaced vertically oriented knife blade unit on said tube with the knife blades running across said tube, introducing a gas into said furnace, thereby filling said tube with gas, raising the temperature of said tube to its softening temperature, thereby to form filled, sealed, and severed gas filled hollow structures, and subsequently cooling said hollow structures below said softening temperature.

3. The method of claim 1 wherein said hollow structure is made of material which is inelastic at ambient room temperature.

4. The method of claim 1 wherein said enclosure is a sphere.

5. A method for making small spheres filled with ionizable gas having uniform ionization characteristics comprising the steps of
   providing a heat deformable tube of predetermined dielectric constant,
   cleaning said tube to remove gaseous and particulate contaminants,
   sealing one end of said tube,
   evacuating said sealed tube,
   filling said evacuated tube with ionizable gas by introducing said ionizable gas into the evacuated portion of said tube,
   sealing the other end of said tube,
   placing said tube on a heatable platen in a controlled atmosphere furnace,
   sealing and severing said tube by placing a multiple-blade knife-blade unit having a number of spaced vertically oriented blades on said tube with the knife blades running across said tube, introducing an inert gas into said furnace, and, raising the temperature of said tube to its softening temperature thereby to form closed hollow gas-filled structures,
   lowering the temperature below said softening temperature,
   cleaning said hollow gas-filled structures to remove exterior contaminants,
   providing an inert atmosphere around said hollow gas-filled structures,
   heating said hollow gas-filled structures above said softening temperature while maintaining a predetermined pressure profile of said inert atmosphere with respect to that of the gas within said hollow gas-filled structures during the time the temperature of said structures is above said softening temperature to allow formation of spheres of a predetermined size, and
   lowering the temperature of said spheres below said softening temperature.

6. The method of claim 5 wherein said step of maintaining the pressure of said inert atmosphere to allow sphere formation includes the steps of
   initially maintaining a pressure differential between the pressure of the gas in said hollow gas-filled structures and said inert atmosphere until spheres of said predetermined size are formed and then adjusting the pressure of said inert atmosphere to maintain the size of the spheres thus formed, said adjusted pressure being below that of the gas within said hollow structures.

7. A method for making small spheres filled with gas comprising the steps of
   providing a heat deformable tube of predetermined dielectric constant,
   filling said tube with gas,
   placing said tube on a heatable platen in a controlled atmosphere furnace,
   sealing and severing said tube by placing a multiple-blade, knife blade unit having a number of spaced vertically oriented blades on said tube with the knife blades running across said tube, and, raising the temperature of said tube to its softening temperature thereby to form closed hollow gas-filled structures by said knife blades cutting and sealing said tube,
   heating said hollow gas-filled structures above said softening temperature while maintaining a predetermined pressure profile of said atmosphere surrounding said hollow gas-filled structures with respect to that of the gas within said hollow gas-filled structures during the time the temperature of said structures is above said softening temperature to allow formation of spheres of a predetermined size, and lowering the temperature of said spheres below said softening temperature.

8. The method of claim 7 wherein said step of maintaining the pressure of said atmosphere to allow sphere formation includes the steps of initially maintaining a pressure differential between the pressure of the gas in said hollow gas-filled structures and said atmosphere until spheres of said predetermined size are formed.

9. The method of claim 7 wherein an exterior surface of said heatable platen and said knife blades are platinum.

10. A method for making small spheres filled with ionizable gas having uniform ionization characteristics comprising the steps of providing a heat deformable tube of predetermined dielectric constant, cleaning said tube to remove gaseous and particulate contaminants, placing said tube on a heatable platen in a controlled atmosphere furnace, filling, sealing and severing said tube by placing a multiple, spaced vertically oriented knife blade unit on said tube with the knife blades running across said tube, introducing an ionizable gas into said furnace, thereby filling said tube with ionizable gas, and, raising the temperature of said tube to its softening temperature thereby to form closed hollow gas-filled structures, providing an inert atmosphere around said hollow gas-filled structures, heating said hollow gas-filled structures above said softening temperature while maintaining a predetermined pressure profile of said inert atmosphere with respect to that of the gas within said hollow gas-filled structures during the time the temperature of said structures is above said softening temperature to allow formation of spheres of a predetermined size, and lowering the temperature of said spheres below said softening temperature.

11. The method of claim 10 wherein said step of maintaining the pressure of said inert atmosphere to allow sphere formation includes the steps of initially maintaining a pressure differential between the pressure of the gas in said hollow gas-filled structures and said inert atmosphere until spheres of said predetermined size are formed.

* * * * *